(12) United States Patent
Bischinger et al.

(10) Patent No.: US 7,969,984 B2
(45) Date of Patent: Jun. 28, 2011

(54) NETWORK-INITIATED IMS REGISTRATION IN A COMMUNICATION SYSTEM

(75) Inventors: Kurt Bischinger, Vienna (AT); Roland Hechwartner, Vienna (AT)

(73) Assignee: T-Mobile International AG, Bonn (DE)

( * ) Notice: Subject to any disclaimer, the term of this patent is extended or adjusted under 35 U.S.C. 154(b) by 208 days.

(21) Appl. No.: 12/296,282

(22) PCT Filed: Apr. 4, 2007

(86) PCT No.: PCT/EP2007/003025
§ 371 (c)(1),
(2), (4) Date: May 27, 2009

(87) PCT Pub. No.: WO2007/115754
PCT Pub. Date: Oct. 18, 2007

(65) Prior Publication Data
US 2010/0054220 A1    Mar. 4, 2010

(30) Foreign Application Priority Data
Apr. 6, 2006  (DE) .................... 10 2006 016 565

(51) Int. Cl.
*H04L 12/28* (2006.01)
(52) U.S. Cl. .................. 370/392; 370/352; 370/338
(58) Field of Classification Search .............. None
See application file for complete search history.

(56) References Cited

U.S. PATENT DOCUMENTS

| 2004/0243680 | A1  | 12/2004 | Mayer |
| 2009/0191867 | A1* | 7/2009  | Siegel et al. ............... 455/435.1 |
| 2009/0298500 | A1* | 12/2009 | Beckmann et al. ........ 455/435.1 |

FOREIGN PATENT DOCUMENTS

| EP | 1555838 A2 | 7/2005 |
| EP | 1571864 A1 | 9/2005 |

OTHER PUBLICATIONS

Universal Mobile Telecommunications System (UMTS), ETSI Standards, European Telecommunications Standards Institute, Sophia-Antipo, FR, Bd. 3-SA2, Nr. V610, Jun. 2004, Seiten 1-35, XP014027162, ISSN: 0000-0001.

* cited by examiner

*Primary Examiner* — Duc C Ho
(74) *Attorney, Agent, or Firm* — Browdy and Neimark, PLLC

(57) ABSTRACT

The invention relates to a method and a system for the network-initiated IMS registration of a telecommunication terminal. According to said method, the network transmits a message having specific characteristics to the terminal via an existing communication link, and the terminal recognizes said message as an IMS registration request based on the characteristics of the message end subsequently sends a registration message to the network to register with the IMS.

8 Claims, 2 Drawing Sheets

Legend:  double line: ====== new interface

| | |
|---|---|
| UE | ... User Equipment |
| SGSN | ... Serving GPRS Support Node |
| GGSN | ... Gateway GPRS Support Node |
| MSC | ... Mobile Services Switching Center |
| CSCF | ... Call State Control Function |
| AS | ... Application Server |
| SMS-SC | ... SMS Service Center |

US 7,969,984 B2

NETWORK-INITIATED IMS REGISTRATION IN A COMMUNICATION SYSTEM

FIELD OF INVENTION

The invention relates to a method and a system for network-initiated IMS registration of a telecommunication terminal in a communication system.

PRIOR ART

The IMS-IP Multimedia Core Network Subsystem [3GPP TS22.228] is a central integration platforms [sic] for the control of mobile radio telephone services, subscriber management and billing for mobile radio telephone services that are built on the IP protocol. The IMS concept is supported by 3GPP ($3^{rd}$ Generation Partnership Project) and by the UMTS forum (UMTS: Universal Mobile Telecommunication System) and is intended to offer a broad application scenario for individual and group communication. This applies equally for real-time and non-real-time applications. The IMS standard describes the functions of the network elements and the interfaces between them. The individual network elements can assume various functions, for example, an application server makes the services available and call-processing elements handle the signaling, database systems supply user data, media servers play recordings and gateways connect the different access networks to each other. The IMS makes it possible to carry out IP multi-media services, such as e.g. voice telephony by means if VoIP (Voice over IP), video conferences, or the transmission of data between multiple users within a GSM/UMTS mobile communication system. This does require, however, that the user is registered in the IMS. For this purpose, the so-called IMS client, i.e. the service-requesting application at the terminal (telephone) of the user must register in the IMS by means of an SIP message (SIP—Session Initiation Protocol.) Only after that is the user addressable and reachable via the IMS.

The IMS builds on other networks that can make an IP connection available. This includes mobile radio telephone networks of the second and third generation (UMTS), as well as hard-wired networks, like the Internet.

There currently is no mechanism provided how to get the IMS client in the terminal of a user who already has an IP connection to carry out an IMS registration so as to be reachable via the IMS. However, not all user terminals will perform an IMS registration by default immediately after being switched on; these terminals can therefore not be reached via the IMS and utilize the services.

A default registration of the user terminals in the IMS after being switched on also is not desirable in all cases, particularly if IMS services are only seldomly required, as the registration permanently ties up network resources.

DISCLOSURE OF THE INVENTION

It is the object of the invention to provide a mechanism how to get the IMS client in the terminal of a user to carry out an IMS registration, in order to be reachable via the IMS.

This object is met with the characteristics of the independent claims, which are hereby referred to.

Preferred embodiments of the invention are specified in the dependent claims, which are hereby referred to.

Non-IMS-registered units are not reachable in a network via the IMS, even though they have an IP or circuit-switched connection. With the inventive network-initiated triggering of an IMS (SIP) registration procedure by the IMS client, IMS reachability is made possible without having to permanently occupy the resources of the communication network.

The invention now describes a method for a network-initiated triggering of an IMS registration, i.e., a SIP registration, by an IMS client in a mobile radio telephone network or fixed-line network based on the IMS (IP Multimedia Core Network Subsystem.)

To initiate the IMS registration, according to the invention a special message is transmitted over an existing communication link to the terminal and is recognized by the same based on its characteristics as to be forwarded to the IMS client, which then takes place. The IMS client, in turn, now sends an SIP register message to the IMS, in order to register in the conventional manner. The remaining IMS registration process now takes place as already defined in the IMS standard.

DESCRIPTION OF PREFERRED EXEMPLARY EMBODIMENTS OF THE INVENTION

Figure 1:
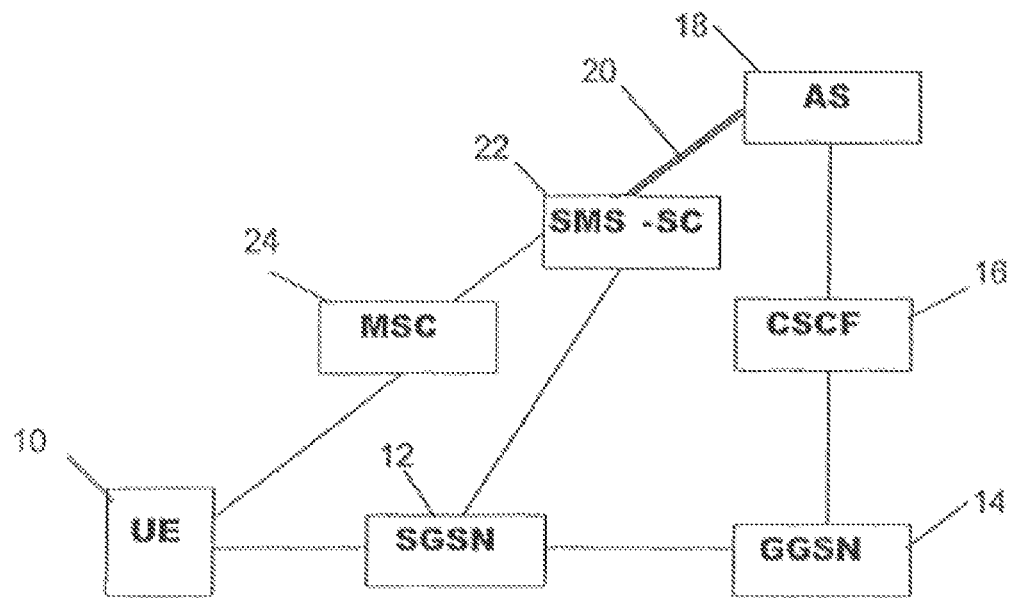
FIG. 1 shows an overview of the components involved in the method and the connection of the application server to the short-message service center according to a first exemplary embodiment of the invention.

In accordance with a first exemplary embodiment of the invention according to FIG. 1, a short message can be used as the message for initiating the IMS registration. This option is available in a mobile radio network. The mobile radio network is utilized as the access network to the IMS service and for transmitting the short message. The access network may be a mobile radio network operating according to GPRS (General Packet Radio Service) guidelines.

The mobile radio network includes a GPRS gateway exchange SGSN (Serving GPRS Support Node) 12 serving a user terminal UE (User Equipment) 10 that is connectable via a first signal connection operating according to the SIP standard to the terminal 10. Additionally, the access network has a GPRS gateway mobile switching center GGSN (Gateway GPRS Support Node) 14, that is connected via a second signal connection operating according to the SIP standard to the SGSN 12.

The transition between the IMS and the access network is implemented by means of a call session control function 16 (CSCF). The CSCF 16 comprises control functions for the connection status between the IMS (IP network) and the access network. Through the SCSF the user is registered with his user terminal 10 and the SIP connection and services and service characteristics are managed. It communicates for this purpose with the user terminal 10 and with an application server 18.

The application server 18 AS in the IMS that desires to trigger the IMS registration of a user transmits, via an interface connection 20 that is newly established within the framework of the invention a request to the short message service center 22 (SMS-SC) and the mobile switching center 24 (MSC), a specially coded short message to the terminal 10 of the user (see FIG. 1). The special coding of the short message may be contained, for example, in the message type, in the message class, or in some other parameter of the short message, or also in the content of the message. Because of this special coding of the "registration" short message, the terminal 10 of the user recognizes that this is a short message that is to be forwarded to an SIP or IMS client of the terminal 10. The SIP or IMS client of the user terminal is induced, by the "registration" short message to initiate an IMS registration as defined in the IMS standard.

Furthermore, it would also be possible to introduce a general application identity for short messages that generally permits to address applications on the terminal, so as to transmit data to them by means of short messages. This requires that each application must be given a unique identity.

Before a short message can be sent via the mobile radio network to the terminal of the user, the IMS identity, the so-called Public User Identity, must be converted to a mobile subscriber ISDN number (MSISDN) or a subscriber identity IMSI (International Mobile Subscriber Identity), which is required for addressing purposes for the short message service SMS. To achieve this, an external database or corresponding subscriber database HSS (Home Subscriber Service) can be queried by the application server or by a network element of the mobile radio network (e.g., SMS-SC or CSCF) via existing mechanisms.

Figure 2:
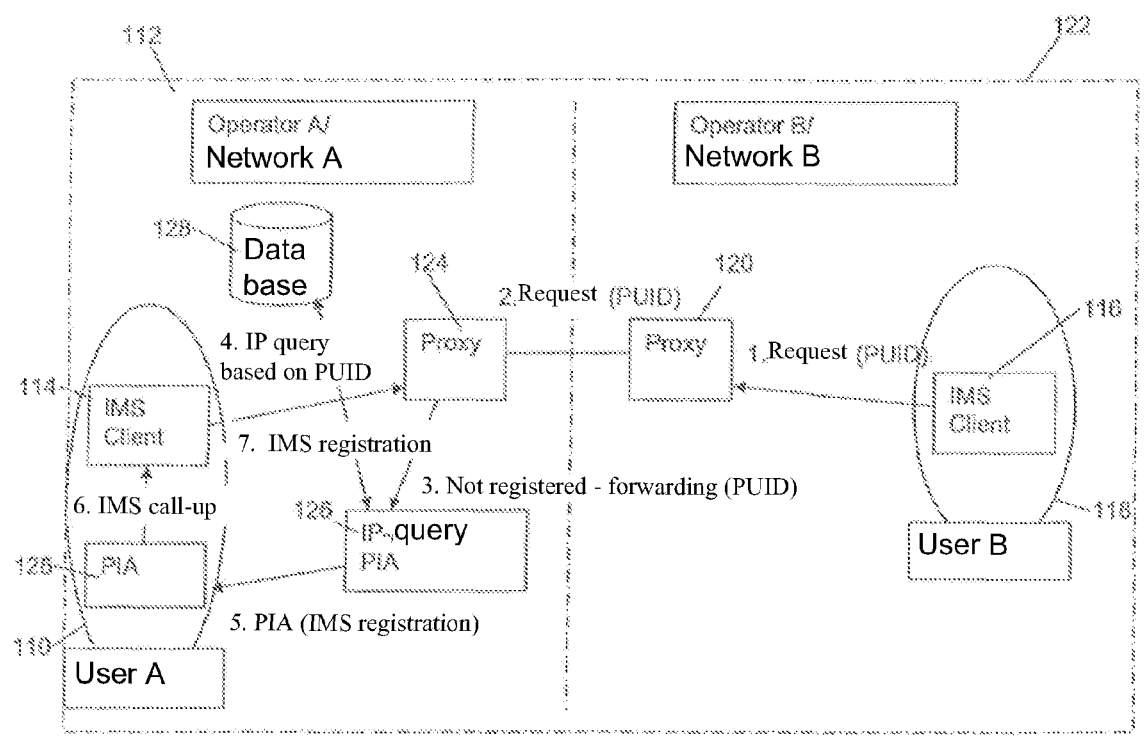
FIG. 2 shows a schematic sequence of events of an SIP registration with preceding initiation according to a second exemplary embodiment of the invention.

In accordance with a second exemplary embodiment of the invention according to FIG. 2, an IP data packet or control message may be used as the message for initiating the IMS registration.

If an IP connection of the terminal 110 of a user A to his network A 112 already exists and if it has an IP address assigned to it, an IMS client 114 in the terminal 110 of the user A can be informed, for example by means of a special IP packet, that the IMS registration is desired. This connection request is issued, for example, by an IMS client 116 of the terminal 118 of a second user B. For this purpose the user B issues a request with the IMS identity (Public User ID, PUID) of the user A, which is received in a proxy 120 of the network B 122 of the user B and routed to a proxy 124 of the network A of the wanted user A (Steps 1 and 2).

After it has been determined that the user A is not registered in the IMS (Step 3), the IMS identity (PUID) must first be converted to the current IP address of the user A. This conversion of the PUID to the IP address may take place in the network of the wanted user A. An (external) database 128 or the subscriber database HSS (Home Subscriber Server) is queried for this purpose by means of an entity located in the network A 112 of the wanted user A or by means of a "Push Invoke Application (PIA) Interface/Protocol 126 that is newly defined within the framework of the invention. Via Public User ID (PUID) the IMSI and the IP address that is currently assigned to the user are queried from the database 128 (Step 4). By means of the Push Invoke Application (PIA) Interface/Protocol 126, i.e. an interface/protocol for automatic call-up of applications, the IMS client 114 of the terminal A 110 is informed that the IMS registration is desired, or the IMS client can, by means of a suitable framework, the start of the IMS client can be initiated (Step 5) [sic].

The Push Invoke Application Protocol builds on the known TCPs (Transmission Control Protocol), and/or on the UDP (User Datagram Protocols). It contains a header (an identifier) for the application that is to be notified, as well as additional specific parameters for the application that is to be called up (Step 6.) An application that builds on the PIA protocol can now already be the specific client (IMS client) that is to be notified, or, again, a generic client with interfaces to different clients, for example IMS, SMS, MMS. The IMS client then carries out the requested IMS registration (Step 7.)

LIST OF REFERENCE NUMERALS 1-7 Process steps (FIG. 2)
10 User terminal
12 SGSN
14 GGSN
16 CSCF
18 Application server
20 Interface
22 Short Message Center
24 Mobile Exchange
110 User terminal A
112 Network A
114 IMS Client A
116 IMS Client B
118 User terminal B
120 Proxy
122 Network B
124 Proxy
126 PIA
128 Database

What is claimed is:

1. A method for network-initiated IMS registration of a telecommunication terminal of a user whereby the network transmits a message having specific characteristics to the terminal via an existing communication link, and the terminal recognizes the message as an IMS registration request based on the characteristics of the message and subsequently sends a registration message to the network to register with the IMS, wherein the network is a packet data oriented network or IP network, wherein an IP data packet or a control message is used as the message for initiating the IMS registration, wherein by means of an interface/protocol for automatic call-up of applications comprising one of a Push Invoke Application or PIA Interface/Protocol, and IMS client of the user terminal is informed that the IMS registration is desired.

2. A method according to claim 1, wherein the network is a mobile communication network.

3. A method according to claim 1, wherein the message contains a coding.

4. A method according to claim 1, wherein if an IP connection of the user terminal with the network already exists and if the IP connection of the user terminal has an IP address assigned thereto, an IMS client of the user terminal is informed by means of the IP message or control message that the IMS registration is desired.

5. A method according to claim 1, wherein for addressing the message a conversion of the IMS identity of the user terminal to a subscriber identity IMSI of the user and an IP address of the terminal is performed with the aid of a database query.

6. A system for carrying out a method for network-initiated IMS registration of a telecommunication terminal of a user, wherein means are provided in the network to transmit a message having specific characteristics to the terminal via an existing communication link, and means are provided in the terminal to recognize the message as an IMS registration request based on the characteristics of the message and to subsequently send a registration message to the network to register with the IMS, wherein an interface/protocol for automatic call-up of applications in the user terminal is provided in the network in the form of a Push Invoke Application Interface/Protocol.

7. A system according to claim 6, wherein the network is a mobile communication network.

8. A system according to claim 6, wherein the network is a packet data oriented network or IP network.

* * * * *